United States Patent
Peck

(10) Patent No.: US 9,856,934 B2
(45) Date of Patent: Jan. 2, 2018

(54) SURFACE VENTILATED DISC BRAKE ROTOR

(71) Applicant: Mahindra N.A. Tech Center, Troy, MI (US)

(72) Inventor: David E. Peck, Rochester Hills, MI (US)

(73) Assignee: Mahindra N.A. Tech Center, Troy, MI (US)

(*) Notice: Subject to any disclaimer, the term of this patent is extended or adjusted under 35 U.S.C. 154(b) by 37 days.

(21) Appl. No.: 14/977,748

(22) Filed: Dec. 22, 2015

(65) Prior Publication Data

US 2017/0175835 A1   Jun. 22, 2017

(51) Int. Cl.
| | |
|---|---|
| F16D 65/12 | (2006.01) |
| F16D 65/847 | (2006.01) |
| F16D 65/02 | (2006.01) |

(52) U.S. Cl.
CPC ......... *F16D 65/128* (2013.01); *F16D 65/123* (2013.01); *F16D 65/847* (2013.01); *F16D 2065/132* (2013.01); *F16D 2065/1328* (2013.01)

(58) Field of Classification Search
CPC ...... F16D 65/12; F16D 65/123; F16D 65/128; F16D 2065/1328; F16D 65/847; F16D 2250/0046; F16D 2069/004; F16D 2065/1332; F16D 2055/0058;
(Continued)

(56) References Cited

U.S. PATENT DOCUMENTS

| | | |
|---|---|---|
| 2,418,719 A | 4/1947 | Mann |
| 3,258,089 A | 6/1966 | Hayes |
| 3,366,202 A | 1/1968 | James |

(Continued)

FOREIGN PATENT DOCUMENTS

| | | | |
|---|---|---|---|
| DE | 2620261 A1 | 11/1977 | |
| EP | 1085230 A1 | 3/2001 | |
| WO | WO 2013120942 A1 * | 8/2013 | ........... F16D 65/125 |

OTHER PUBLICATIONS

Performance Machine 11.8 inch Front Brake Rotor, image post date 2006, site visited Jan. 4, 2017, (online), <http://www.revsilla.com/motorcycle/performance-machine-118-front-brake-rotor-for-harley-2006-2016#ask_and_answer_tab>.

(Continued)

*Primary Examiner* — Anna M Momper
*Assistant Examiner* — Mahbubur Rashid
(74) *Attorney, Agent, or Firm* — Harness, Dickey & Pierce, P.L.C.

(57) ABSTRACT

A disc brake rotor including a hub portion and a brake disc is provided. The brake disc extends radially outward from the hub portion and includes an outboard disc face and an inboard disc face. A plurality of channels are disposed in the brake disc that are circumferentially spaced from one another. Any one channel in the plurality of channels is open to either the outboard disc face or the inboard disc face. The brake disc includes an outer ring and an inner ring that are circumferentially continuous and uninterrupted along at least the outboard disc face and the inboard disc face. The outer ring is radially spaced from the inner ring with the plurality of channels disposed radially between the outer ring and the inner ring. Advantageously, this arrangement increases shear strength of the brake disc while providing enhanced cooling.

13 Claims, 12 Drawing Sheets

(58) Field of Classification Search
CPC ......... F16D 2200/0017; F16D 65/0025; F16D 2065/789
USPC .................................................. 188/218 XL
See application file for complete search history.

(56) References Cited

U.S. PATENT DOCUMENTS

| | | | |
|---|---|---|---|
| 3,391,763 A | 7/1968 | Severson | |
| 3,393,776 A | 7/1968 | Ludwig | |
| 3,623,577 A | 11/1971 | Scharlack | |
| 3,721,322 A | 3/1973 | Thompson | |
| 3,964,583 A | 6/1976 | Montalvo, Jr. | |
| 4,174,024 A * | 11/1979 | Hagiwara | F16D 66/02 116/208 |
| 4,448,291 A | 5/1984 | Ritsema et al. | |
| 4,470,485 A | 9/1984 | Warwick | |
| 4,811,822 A | 3/1989 | Estaque | |
| 5,005,676 A * | 4/1991 | Gassiat | F16D 55/28 188/218 XL |
| 5,107,967 A * | 4/1992 | Fujita | B60T 1/065 188/156 |
| 5,279,396 A | 1/1994 | Estaque et al. | |
| 5,427,212 A | 6/1995 | Shimazu et al. | |
| 5,429,216 A | 7/1995 | Kahr | |
| 5,487,452 A | 1/1996 | Moinard et al. | |
| 5,544,726 A | 8/1996 | Topouzian et al. | |
| 5,706,915 A | 1/1998 | Shimazu et al. | |
| 5,735,366 A | 4/1998 | Suga et al. | |
| 5,772,286 A | 6/1998 | Jordan | |
| 5,862,892 A | 1/1999 | Conley | |
| 5,878,848 A | 3/1999 | Zhang | |
| 6,073,735 A | 6/2000 | Botsch et al. | |
| 6,119,820 A | 9/2000 | Steptoe et al. | |
| 6,142,267 A | 11/2000 | Sporzynski et al. | |
| 6,161,660 A | 12/2000 | Suga et al. | |
| 6,164,423 A | 12/2000 | Dickerson | |
| 6,216,829 B1 | 4/2001 | Daudi | |
| 6,234,282 B1 | 5/2001 | Martin | |
| 6,247,562 B1 | 6/2001 | Gotti et al. | |
| 6,260,669 B1 | 7/2001 | Daudi | |
| D446,756 S | 8/2001 | York | |
| 6,283,255 B1 | 9/2001 | Gardner et al. | |
| 6,308,808 B1 | 10/2001 | Krenkel et al. | |
| 6,318,513 B1 | 11/2001 | Dietrich et al. | |
| D456,326 S | 4/2002 | York | |
| D458,198 S | 6/2002 | Oberti | |
| D458,567 S | 6/2002 | Oberti | |
| D458,882 S | 6/2002 | Oberti | |
| D459,282 S | 6/2002 | Oberti | |
| D465,179 S | 11/2002 | Ballinger | |
| D471,140 S | 3/2003 | Oberti | |
| 6,536,564 B1 * | 3/2003 | Garfinkel | F16D 65/12 188/218 XL |
| D482,643 S | 11/2003 | Gavin | |
| D484,836 S | 1/2004 | Gavin | |
| 6,739,437 B2 | 5/2004 | Garfinkel et al. | |
| 6,797,094 B2 | 9/2004 | Pacchiana et al. | |
| D512,353 S | 12/2005 | Aloy | |
| 6,978,866 B2 | 12/2005 | Niebling et al. | |
| D513,722 S | 1/2006 | Aloy | |
| 7,017,718 B2 | 3/2006 | Gotti et al. | |
| 7,066,306 B2 | 6/2006 | Gavin | |
| 7,097,006 B2 | 8/2006 | Veneziano et al. | |
| 7,104,368 B2 | 9/2006 | Cornolti et al. | |
| 7,219,777 B2 | 5/2007 | Lin | |
| D565,487 S | 4/2008 | Zhang | |
| D605,017 S | 12/2009 | McElmury | |
| D605,099 S | 12/2009 | Schmitz et al. | |
| D607,795 S | 1/2010 | Schmitz et al. | |
| D607,796 S | 1/2010 | Schmitz et al. | |
| 7,690,484 B2 | 4/2010 | Oberti et al. | |
| D624,472 S | 9/2010 | Schmitz et al. | |
| 7,934,777 B1 | 5/2011 | Yuhas | |
| D640,620 S | 6/2011 | Bielis, IV et al. | |
| D640,621 S | 6/2011 | Schmitz et al. | |
| D640,622 S | 6/2011 | Schmitz et al. | |
| D640,960 S | 7/2011 | Schmitz et al. | |
| D647,015 S | 10/2011 | Henning | |
| D647,442 S | 10/2011 | Schmitz et al. | |
| D655,147 S | 3/2012 | Zorovich et al. | |
| D664,080 S | 7/2012 | Perry et al. | |
| D664,487 S | 7/2012 | Perry et al. | |
| 8,371,422 B2 | 2/2013 | Frost et al. | |
| D690,634 S | 10/2013 | Joseph | |
| D690,650 S | 10/2013 | Lin et al. | |
| D691,528 S | 10/2013 | Joseph | |
| D700,551 S | 3/2014 | Davenport, III | |
| 8,733,517 B2 | 5/2014 | Tironi et al. | |
| D709,522 S | 7/2014 | Yano et al. | |
| D719,197 S | 12/2014 | Tsuchiya et al. | |
| D719,198 S | 12/2014 | Tsuchiya et al. | |
| D726,300 S | 4/2015 | DeFilippis | |
| 9,062,730 B2 | 6/2015 | Waninger | |
| 9,068,612 B2 | 6/2015 | Gebauer et al. | |
| D747,244 S | 1/2016 | Nosworthy | |
| 9,255,617 B2 | 2/2016 | Ronchi et al. | |
| D753,037 S | 4/2016 | Pasfield | |
| 9,371,875 B2 | 6/2016 | Noriega Gonzalez et al. | |
| 9,429,203 B2 | 8/2016 | Watarai et al. | |
| 2003/0205438 A1 | 11/2003 | Hartsock | |
| 2004/0065514 A1 | 4/2004 | Chen | |
| 2004/0200678 A1 | 10/2004 | Lin | |
| 2005/0161295 A1 | 7/2005 | Nilsson et al. | |
| 2005/0183909 A1 | 8/2005 | Rau et al. | |
| 2006/0076200 A1 | 4/2006 | Dessouki et al. | |
| 2007/0181390 A1 | 8/2007 | Korm | |
| 2007/0199778 A1 | 8/2007 | Lee | |
| 2008/0142319 A1 | 6/2008 | Manter | |
| 2009/0026027 A1 | 1/2009 | Martino | |
| 2010/0116598 A1 | 5/2010 | Watarai | |
| 2012/0138398 A1 | 6/2012 | Nadal Aloy | |
| 2012/0168266 A1 | 7/2012 | Veneziano et al. | |
| 2012/0255820 A1 | 10/2012 | McCord et al. | |
| 2013/0133998 A1 | 5/2013 | Maronati et al. | |
| 2013/0327602 A1 | 12/2013 | Barber et al. | |
| 2014/0151166 A1 | 6/2014 | Tironi et al. | |
| 2014/0158486 A1 | 6/2014 | Schorn et al. | |
| 2015/0015057 A1 | 1/2015 | Oberti et al. | |
| 2015/0267765 A1 | 9/2015 | Kim et al. | |
| 2016/0039436 A1 | 2/2016 | Bhagwatkar et al. | |
| 2016/0102564 A1 | 4/2016 | Tanaka et al. | |
| 2016/0290423 A1 | 10/2016 | Tironi et al. | |

OTHER PUBLICATIONS

Racingbrake UP Rotor, image post date Aug. 3, 2007, site visited Jan. 4, 2017, (online), <https://www.heeltoeauto.com/pitboard/?p=112>.

Scappa carbon disc, image post date Sep. 26, 2014, site visited Jan. 4, 2017, (online), <http://www.light-bikes.it/forum/index.php?topic=37099.0>.

Slotted Brake Rotors, image post date Jan. 1, 2014, site visited Jan. 4, 2017, (online), <http://web.archive.org/web/20140101225324/http://brakeperformance.com/>.

Brake Discs in Delhi, image post date 1996, site visited Jan. 4, 2017, (online), <https://dir.indiamart.com/delhi/brake-disc.html>.

* cited by examiner

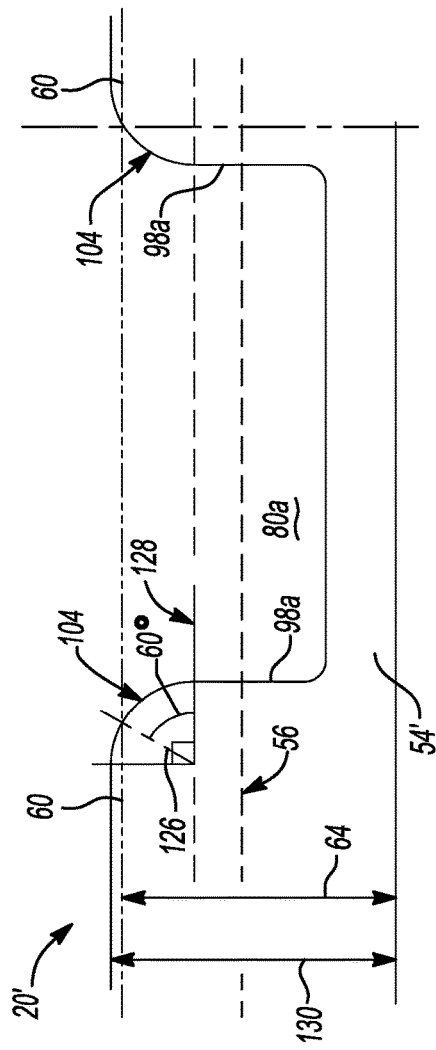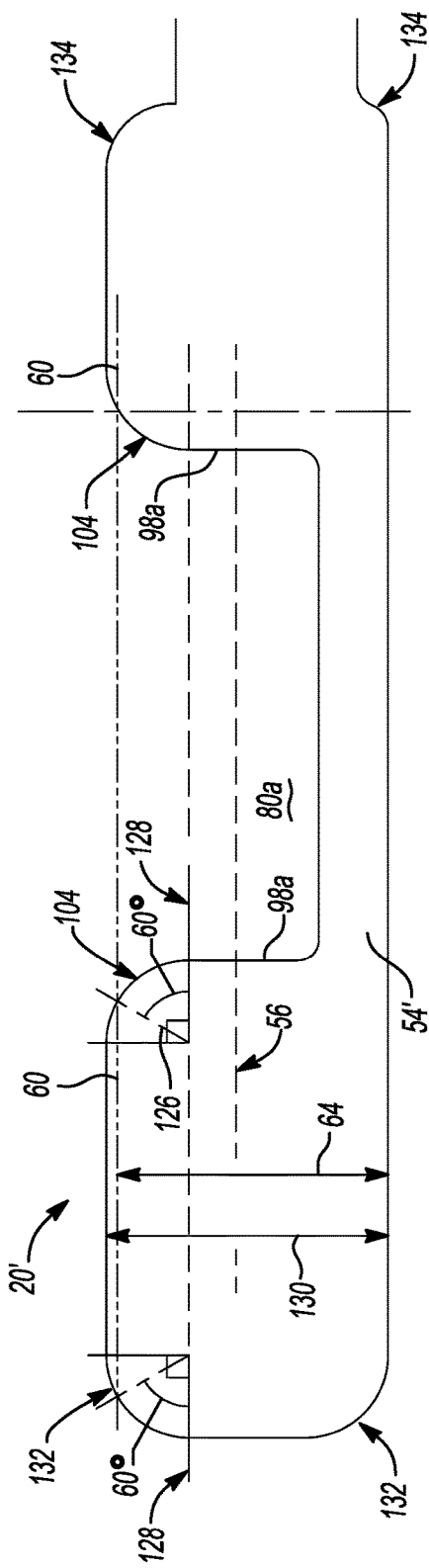

SURFACE VENTILATED DISC BRAKE ROTOR

FIELD

The present disclosure generally relates to disc brake rotors and more particularly to ventilated disc brake rotors such as those used in vehicle brake systems.

BACKGROUND

This section provides background information related to the present disclosure which is not necessarily prior art.

Many different types of vehicles are equipped with brake systems. Such vehicles may include, for example, heavy duty construction vehicles, tractors, trucks, and automobiles. One common type of brake system utilizes disc brake rotors that rotate with wheels of the vehicle. Such disc brake rotors generally comprise two parts, a hub portion that connects to the wheel and a brake disc that extends radially outward from the hub portion. Typical brake systems also include a brake caliper that applies a clamping force to the brake disc to slow the vehicle or to maintain the vehicle in a stationary condition. The brake caliper is installed over at least part of the brake disc. Each brake caliper typically includes two brake pads that are disposed on opposing sides of the brake disc. During operation of the brake system, the brake pads are moved into contact with the brake disc to apply the clamping force to the brake disc. The friction that is generated between the brake pads and the brake disc opposes rotational movement of the disc brake rotor and also produces heat as a by-product. Excessive heat generation in the disc brake rotor and other components of the brake system can contribute to brake failure, excessive wear, and can negatively impact brake performance, creating a condition that may lead to warping the disc brake rotor and/or decreased brake output torque.

Several attempts have been made to enhance heat transfer away from the disc brake rotor. For example, the brake disc in an internally ventilated disc brake rotor may be constructed of a pair of parallel discs that are connected to one another by a plurality of vanes. The parallel discs provide a braking surfaces that the brake pads contact. The plurality of vanes are circumferentially spaced apart from one another and are internally located within the disc brake rotor such that air can flow between the pair of parallels discs. In another example, cross-drilled disc brake rotors have a plurality of transverse holes drilled into the brake disc. In yet another example, slotted disc brake rotors have a plurality of shallow slots disposed along the braking surface.

In addition to disc brake rotors with the various cooling features described above, other disc brake rotor designs have been developed. One example is disclosed in U.S. Pat. No. 6,739,437, which issued on May 25, 2004 to inventors George A. Garfinkel et al. This patent discusses internally ventilated disc brake rotors that have curved vanes and surface ventilated disc brake rotors that have a plurality of external channels that extend radially across the brake disc. A concern exists regarding the plurality of external channels diminishing the strength of the brake disc, thus making the disc brake rotor more prone to mechanical and/or thermal failure.

SUMMARY

This section provides a general summary of the disclosure, and is not a comprehensive disclosure of its full scope or all of its features.

In accordance with an aspect of the subject disclosure, a disc brake rotor including a hub portion and a brake disc is provided. The brake disc extends radially outward from the hub portion and includes an outboard disc face and an inboard disc face. A plurality of channels are disposed in the brake disc. The plurality of channels are circumferentially spaced apart from one another. Any one channel in the plurality of channels is open to the outboard disc face and is closed to the inboard disc face or is open to the inboard disc face and is closed to the outboard disc face. The brake disc also includes an outer ring and/or an inner ring that are circumferentially continuous and uninterrupted along at least the outboard disc face and the inboard disc face. The outer ring is radially spaced from the inner ring with the plurality of channels disposed radially between the outer ring and the inner ring. Advantageously, the plurality of channels provide increased cooling by greatly increasing a surface area of the brake disc and by generating increased air flow and turbulence in the vicinity of the outboard disc face and the inboard disc face. These characteristics enhance the transfer of heat away from the brake disc through improved convection at the outboard disc face, the inboard disc face, and in the plurality of channels. At the same time, the brake disc of the disclosed disc brake rotor has greater shear strength as compared to other surface ventilated disc brake rotor designs.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 14 is a partial cross-sectional view of the exemplary disc brake rotor illustrated in FIG. 11, taken along section line B-B of FIG. 11, to show that each channel may optionally have rounded edges; and FIG. 15 is a partial cross-sectional view of the exemplary disc brake rotor shown in FIG. 11, taken along section line B-B of FIG. 11, to show that the exemplary disc brake rotor may optionally have rounded edges where the inboard and outboard disc faces meet the inner and outer periphery.

DETAILED DESCRIPTION

Figure 1:
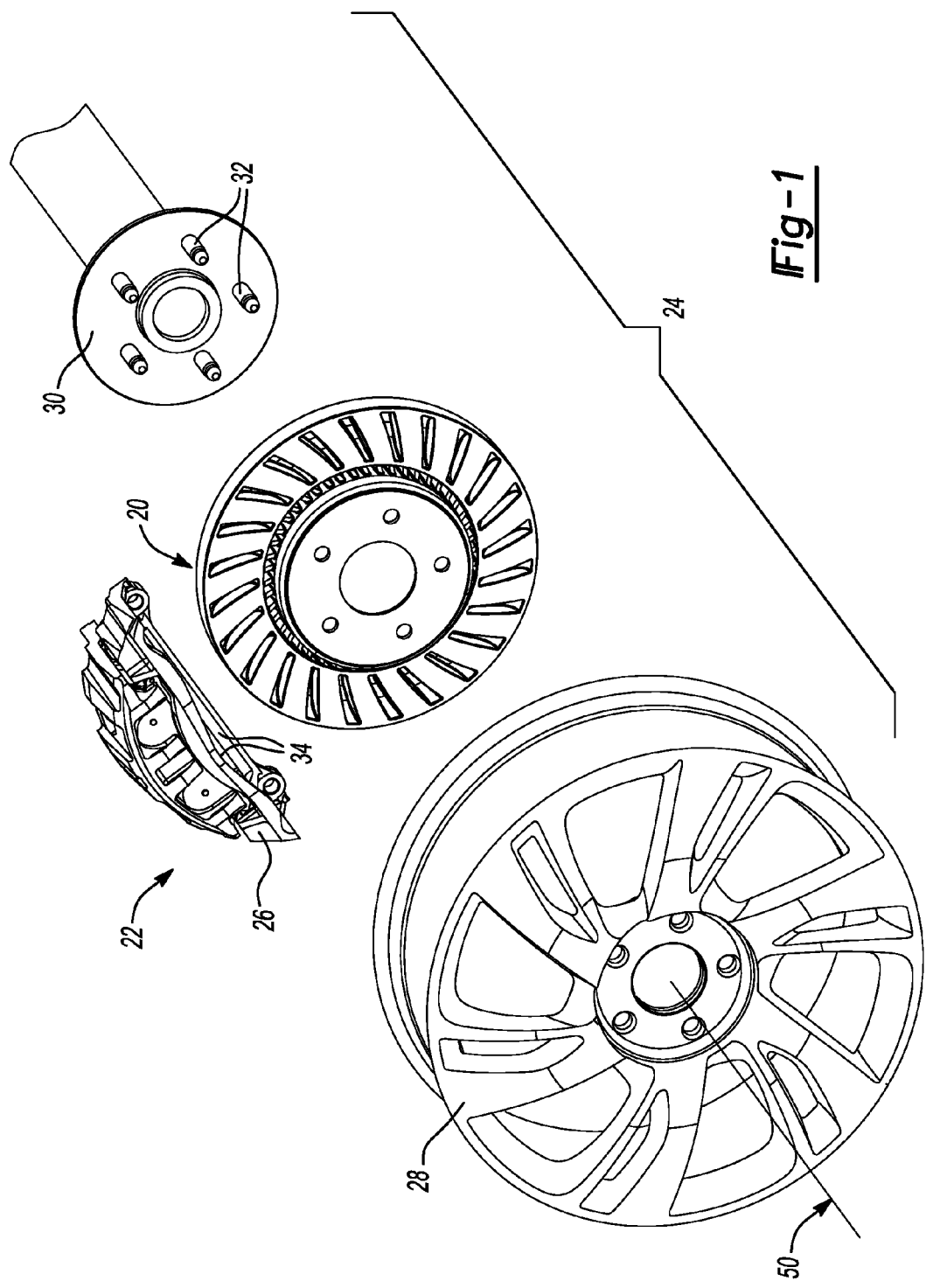
FIG. 1 is an exploded front perspective view of a vehicle wheel-end assembly that includes an exemplary disc brake rotor constructed in accordance with the subject disclosure.

Referring to the Figures, wherein like numerals indicate corresponding parts throughout the several views, a disc brake rotor 20 is disclosed.

Example embodiments are provided so that this disclosure will be thorough, and will fully convey the scope to those who are skilled in the art. Numerous specific details are set forth such as examples of specific components, assemblies, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known components, well-known assemblies, well-known processes, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the apparatus in use or operation in addition to the orientation depicted in the figures. For example, if the apparatus in the Figures is turned over, elements described as "below" or "beneath" other elements or features would then be oriented "above" the other elements or features. Thus, the example term "below" can encompass both an orientation of above and below. The apparatus may be otherwise oriented (rotated 90 degrees or at other orientations) and the spatially relative descriptors used herein interpreted accordingly. In addition, the term "substantially parallel" is used herein to describe elements that are generally aligned with one another plus or minus 5 degrees.

With reference to FIG. 1, it should generally be appreciated that disc brake rotors, such as the disc brake rotor 20 disclosed in the Figures, may be used as part of a braking system 22 in a vehicle (not shown), such as in a heavy duty construction vehicle, tractor, truck, light truck, or automobile. Such braking systems 22 typically apply a clamping force to one or more disc brake rotors to slow the vehicle or to maintain the vehicle in a stationary condition. The braking system 22 includes components that are part of a vehicle wheel-end assembly 24, mainly the disc brake rotor 20 and a brake caliper 26. The vehicle wheel-end assembly 24 also includes a wheel 28 that is mounted to a hub 30 using a plurality of wheel studs 32. The brake caliper 26 is installed over at least part of the disc brake rotor 20 and includes one or more brake pads 34. During operation of the brake system, the one or more brake pads 34 are moved into contact with the disc brake rotor 20 to apply the clamping force to the disc brake rotor 20. In at least some configurations, the brake pads 34 are moved hydraulically.

As illustrated in FIGS. 1-5, the disc brake rotor 20 disclosed herein includes a hub portion 36. The hub portion 36, which is sometimes referred to as a hat portion or a brake hat, has a mounting flange 38 and cylindrical wall 40. The cylindrical wall 40 extends circumferentially about the mounting flange 38 to define a hub receiving cavity 42. The hub receiving cavity 42 is bounded by the mounting flange 38 and the cylindrical wall 40 of the hub portion 36 and is sized to receive the hub 30 of the vehicle. It should be appreciated that when the vehicle is fully assembled, the wheel 28, the hub 30, and the disc brake rotor 20 all rotate together as a single unit. The mounting flange 38 of the hub portion 36 has an outboard hub face 44 and an inboard hub face 46. When the disc brake rotor 20 is installed on the vehicle, the outboard hub face 44 generally faces outward and towards the wheel 28 while the inboard hub face 46 generally faces inward towards hub 30. A central opening 48 is provided in the hub portion 36 that extends through the mounting flange 38 along a rotational axis 50 of the disc brake rotor 20. In addition, a plurality of mounting holes 52 are provided in the hub portion 36 that extend through the mounting flange 38 at circumferentially spaced locations that are positioned radially between the central opening 48 and the cylindrical wall 40 of the hub portion 36. When the disc brake rotor 20 is installed on the vehicle, a portion of the hub 30 may extend through the central opening 48 and the plurality of wheel studs 32 may extend through the plurality of mounting holes 52 to retain the wheel 28 on the hub 30.

Figure 4:
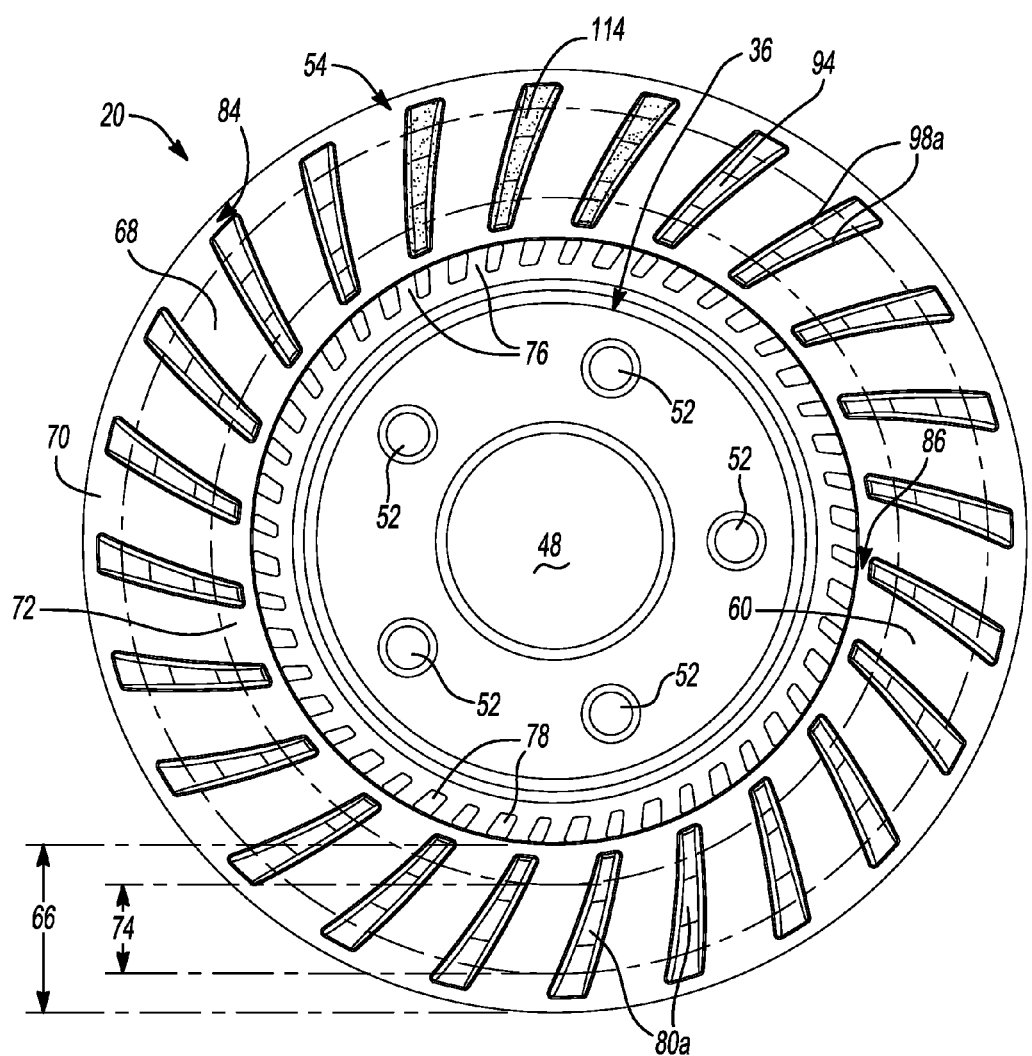
FIG. 4 is a front elevation view of the exemplary disc brake rotor shown in FIG. 1.
Figure 5:
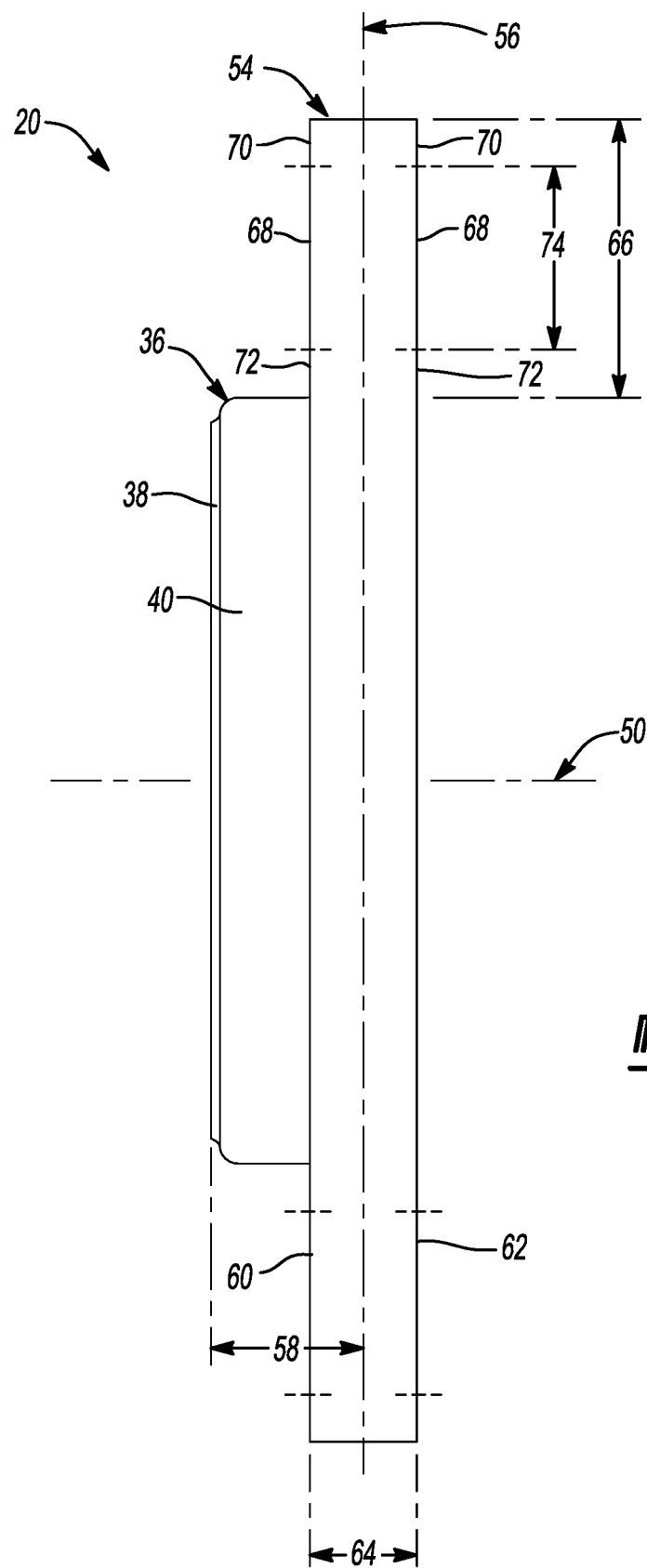
FIG. 5 is a side elevation view of the exemplary disc brake rotor shown in FIG. 1.

The disc brake rotor 20 also includes a brake disc 54 that extends radially outward from the cylindrical wall 40 of the hub portion 36. As best seen in FIG. 5, the brake disc 54 defines a brake disc plane 56 that bisects the brake disc 54 and that is transverse to the rotational axis 50 of the disc brake rotor 20. The mounting flange 38 of the hub portion 36 generally extends parallel to and is spaced from the brake disc plane 56 by an offset distance 58. The brake disc 54 includes an outboard disc face 60 that is disposed on one side of the brake disc plane 56 and an inboard disc face 62 that is disposed on an opposite side of the brake disc plane 56. The outboard disc face 60 extends parallel to and is spaced from the inboard disc face 62 by a brake disc thickness 64. The brake disc thickness 64 extends in a direction that is transverse to the brake disc plane 56. By way of example and without limitation, the brake disc thickness 64 may be within a range of 0.25 inches to 2 inches and the offset distance 58 may be within a range of one half the brake disc thickness 64 to 5 inches. As best seen in FIGS. 4 and 5, each of the outboard disc face 60 and the inboard disc face 62 have a first radial height 66. The first radial height 66 of the outboard disc face 60 and the inboard disc face 62 can be measured in a direction that is parallel to the brake disc plane 56. By way of non-limiting example, the first radial height 66 may be within a range of 1 inch to 6 inches.

Various different brake pad configurations may be utilized with the disc brake rotor 20 disclosed herein. In the example shown in FIG. 6, the brake pads 34 come into contact with only part of the radial height of the outboard disc face 60 and the inboard disc face 62. Each of the outboard disc face 60 and the inboard disc face 62 has a brake pad contact area 68 that is spaced radially between an outer non-contacting area 70 and an inner non-contacting area 72. As best seen in FIGS. 4 and 5, the brake pad contact area 68 of the outboard disc face 60 and the inboard disc face 62 has a second radial height 74 that is less than the first radial height 66. The second radial height 74 of the brake pad contact area 68 can be measured in a direction that is parallel to the brake disc plane 56. By way of non-limiting example, the second radial height 74 may be within a range of 0.75 inches to 5.5 inches.

Figure 2:
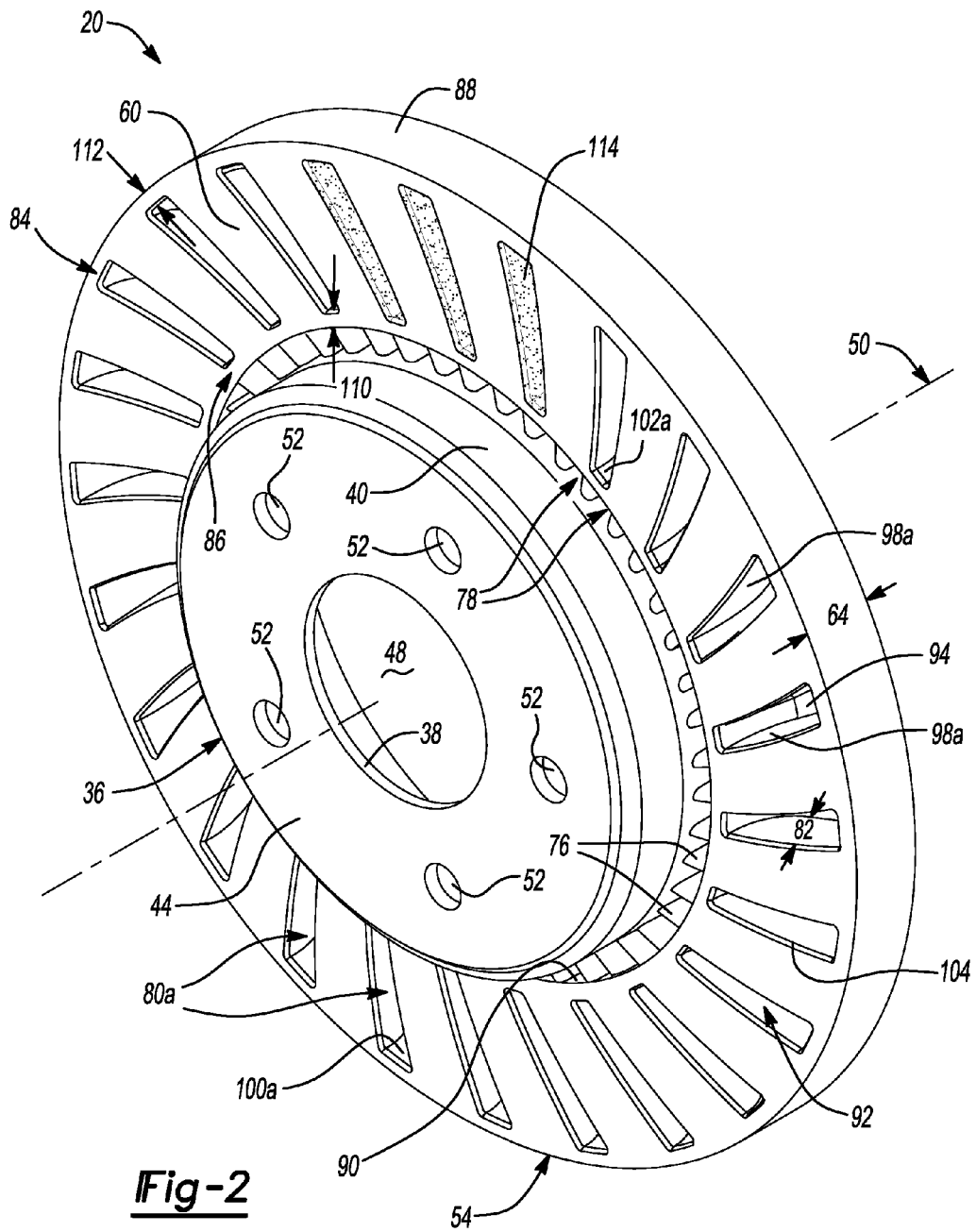
FIG. 2 is a front perspective view of the exemplary disc brake rotor shown in FIG. 1.
Figure 3:
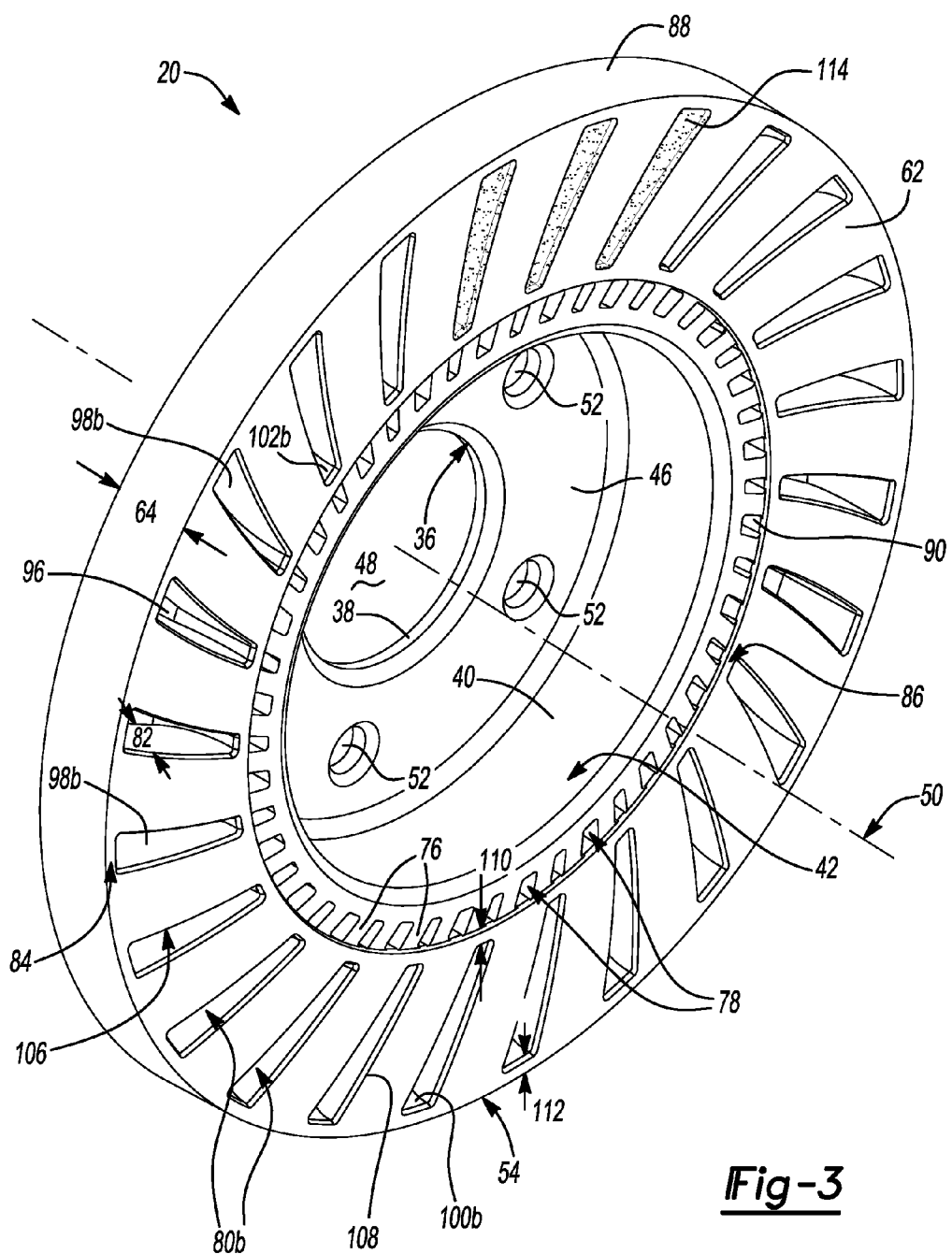
FIG. 3 is a rear perspective view of the exemplary disc brake rotor shown in FIG. 1.

Referring generally to FIGS. 2-4, the disc brake rotor 20 may or may not include a plurality of ribs 76 that extend radially between and interconnect the cylindrical wall 40 of the hub portion 36 and the brake disc 54. The plurality of ribs 76 are circumferentially spaced apart from one another by a plurality of vent passageways 78 that extend completely through the disc brake rotor 20. As such, the plurality of vent passageways 78 permit fluid flow (i.e. air flow) through the disc brake rotor 20 at locations positioned radially between the cylindrical wall 40 of the hub portion 36 and the brake disc 54. The plurality of vent passageways 78 are therefore open to the outboard disc face 60 and the inboard disc face 62 and fluid flow through the plurality of vent passageways 78 helps to cool the brake disc 54. The plurality of ribs 76 may have a variety of different geometries. By way of non-limiting example, the plurality of ribs 76 may extend radially in a straight line, a curved line, or combinations thereof where the plurality of ribs 76 have straight and curved segments or where some of the ribs 76 are straight and some of the ribs 76 are curved. In some configurations, the hub portion 36, the brake disc 54, and the plurality of ribs 76 may be integral with one another as part of a one-piece unit. Alternatively, other configurations are possible where the hub portion 36 and the brake disc 54 are separate components that are connected to one another at the plurality of ribs 76. Obviously, various combinations are possible where the plurality of ribs 76 comprise a separate component part or where the plurality of ribs 76 are integral with the brake disc 54 and not the hub portion 36 or vice versa. It should also be appreciated that the hub portion 36, the brake disc 54, and the plurality of ribs 76 may all be made of the same material, different materials, or combinations thereof. By way of example and without limitation, any of the hub portion 36, the brake disc 54, and the plurality of ribs 76 may be made of cast iron, steel, aluminum, titanium, carbon fiber, ceramic, carbon ceramic materials, or other suitable materials.

Still referring to FIGS. 2-4, the disc brake rotor 20 includes a plurality of channels 80a, 80b, disposed in the brake disc 54, that are circumferentially spaced apart from one another. The plurality of channels 80a, 80b includes a group of outboard channels 80a that are open at the outboard disc face 60 and/or a group of inboard channels 80b that are open at the inboard disc face 62. The plurality of channels 80a, 80b are circumferentially staggered about the brake disc 54 in a sequentially alternating arrangement where each channel in the group of outboard channels 80a is flanked by two channels of the group of inboard channels 80b and where each channel in the group of inboard channels 80b is flanked by two channels of the group of outboard channels 80a. Each channel in the plurality of channels 80a, 80b extends deeply into the brake disc 54 and therefore has a channel depth 82. The channel depth 82 of each channel in the plurality of channels 80a, 80b extends in a direction that is transverse to the brake disc plane 56. In one example, the channel depth 82 of each channel in the plurality of channels 80a, 80b is equal to or greater than half the brake disc thickness 64. By way of example and without limitation, the channel depth 82 may be within a range of just over 1 inch to 1.75 inches when the brake disc thickness 64 equals 2 inches. Due to the channel depth 82 specified herein, the plurality of channels 80a, 80b greatly increase a surface area of the outboard disc face 60 and the inboard disc face 62 and generate increased fluid flow and turbulence in the vicinity of the outboard disc face 60 and the inboard disc face 62. Both of these characteristics enhance the transfer of heat away from the brake disc 54 through improved convection at the outboard disc face 60, the inboard disc face 62, and in the plurality of channels 80a, 80b.

As shown in FIG. 4, each channel in the group of outboard channels 80a may extend across at least part of the outer non-contacting area 70, the brake pad contact area 68, and the inner non-contacting area 72 of the outboard disc face 60. Similarly, each channel in the group of inboard channels 80b extends across at least part of the outer non-contacting area 70, the brake pad contact area 68, and the inner non-contacting area 72 of the inboard disc face 62. This arrangement, where the plurality of channels 80a, 80b extend radially beyond the brake pad contact area 68, improves the cooling of the disc brake rotor 20. Heat transfer and fluid dynamics testing has shown that heat transfer between the brake disc 54 and the surrounding fluid (i.e. the surrounding airflow) is greatest at the outer non-contacting area 70 and the inner non-contacting area 72 of the outboard disc face 60 and the inboard disc face 62. These areas are where direct convection can occur. Even when disc brake rotors are internally ventilated, heat transfer is greatest at the outer non-contacting area and the inner non-contacting area of the outboard disc face and the inboard disc face.

The plurality of vanes in internally ventilated disc brake rotors tend to corrode (i.e. rust) over time. Rust tends to act as a thermal barrier such that the plurality of vanes in internally ventilated disc brake rotors tend to lose their ability to effectively transfer heat away from the internally ventilated disc brake rotor over time. Even when internally ventilated disc brake rotors are new and have little corrosion, heat must first be conducted through the pair of parallel discs before being transferred by convection to the airflow passing between the pair of parallel discs and the plurality of vanes. This also reduces the effectiveness of internally ventilated disc brake rotors. The outer non-contacting area and the inner non-contacting area of the outboard disc face and the inboard disc face on traditional disc brake rotors are relatively flat and therefore do not create turbulence in the vicinity of the outboard disc face and the inboard disc face. By contrast, the plurality of channels 80*a*, 80*b* in the disclosed disc brake rotor 20 extend radially beyond the brake pad contact area 68 and therefore create turbulence in the vicinity of the outer non-contacting area 70 and the inner non-contacting area 72 of the outboard disc face 60 and the inboard disc face 62 to maximize convective heat transfer at these critical areas.

With reference to FIGS. 2-4, the brake disc 54 includes an outer ring 84 and an inner ring 86 that are circumferentially continuous and uninterrupted along at least the outboard disc face 60 and the inboard disc face 62 of the brake disc 54. This means that neither the plurality of vent passageways 78 nor the plurality of channels 80*b*, 80*b* cross, extend into, or otherwise interrupt the outer ring 84 and the inner ring 86 of the brake disc 54 at locations disposed along the outboard disc face 60 and the inboard disc face 62. The outer ring 84 is radially spaced from the inner ring 86 and therefore circumscribes the inner ring 86. It should be appreciated that the outer ring 84 defines an outer periphery 88 (i.e. the outermost part) of the brake disc 54 and the inner ring 86 defines an inner periphery 90 (i.e. the innermost part) of the brake disc 54. The plurality of channels 80*a*, 80*b* are disposed radially between the outer ring 84 and the inner ring 86 and the plurality of ribs 76 and the plurality of vent passageways 78 are disposed radially between the inner ring 86 and the cylindrical wall 40 of the hub portion 36 of the disc brake rotor 20. In other words, the inner ring 86 is positioned radially between the plurality of vent passageways 78 and the plurality of channels 80*a*, 80*b*. Accordingly, the plurality of channels 80*a*, 80*b* do not, themselves, extend to the outer periphery 88 or the inner periphery 90 of the brake disc 54. Advantageously, the continuous and uninterrupted construction of the outer ring 84 and an inner ring 86 at the outboard disc face 60 and the inboard disc face 62 increase shear strength of the brake disc 54. This makes the disclosed disc brake rotor 20 less susceptible to mechanical and/or thermal failure as compared to other surface ventilated disc brake rotors that have channels that extend all the way to the outer periphery and/or the inner periphery of the disc brake rotor. In certain configurations, the brake disc 54 may optionally have an abrupt edge (e.g. a 90 degree transition) where the outboard and inboard disc faces 60, 62 meet the outer periphery 88. Similarly, the brake disc 54 may optionally have an abrupt edge (e.g. a 90 degree transition) where the outboard and inboard disc faces 60, 62 meet the inner periphery 90. As will be explained below, other configurations are possible where these edges or transitions are rounded.

As best seen in FIG. 2, each channel in the group of outboard channels 80*a* includes an open front 92, a back wall 94, a pair of radial walls 98*a*, an outer wall 100*a*, and an inner wall 102*a*. The open front 92 opens to the outboard disc face 60 and the back wall 96 is arranged opposite the open front 92. The pair of radial walls 98*a* are substantially parallel to and circumferentially spaced from one another and are generally defined by material forming the brake disc 54. The outer wall 100*a* extends between the pair of radial walls 98*a* and is generally defined by material forming the outer ring 84 and the inner wall 102*a* extends between the pair of radial walls 98*a* and is generally defined by material forming the inner ring 86. Each of the pair of radial walls 98*a*, the outer wall 100*a*, and the inner wall 102*a* meet the outboard disc face 60 at an external edge 104. Optionally, the external edge 104 may be rounded to reduce brake pad wear and reduce the likelihood of material from one of the brake pads 34 (FIG. 1) from catching in the group of outboard channels 80*a*. The rounded shaped of external edge 104 may also help reduce the effects the group of outboard channels 80*a* has on the machining of the outboard disc face 60 during the manufacturing process.

As best seen in FIG. 3, each channel in the group of inboard channels 80*b* includes an open back 106, a front wall 96, a pair of radial walls 98*b*, an outer wall 100*b*, and an inner wall 102*b*. The open back 106 opens to the inboard disc face 62 and the front wall 94 is arranged opposite the open back 106. The pair of radial walls 98*b* are substantially parallel, other than casting draft angles, and circumferentially spaced from one another and are defined by the material forming the brake disc 54. The outer wall 100*b* extends between the pair of radial walls 98*b* and is defined by the material forming the outer ring 84 and the inner wall 102*b* extends between the pair of radial walls 98*b* and is generally defined by the material forming the inner ring 86. Each of the pair of radial walls 98*b*, the outer wall 100*b*, and the inner wall 102*b* meet the inboard disc face 62 at an internal edge 108. Optionally, the internal edge 108 may be rounded to reduce brake pad wear and reduce the likelihood of material from one of the brake pads 34 (FIG. 1) from catching in the group of inboard channels 80*b*. The rounded shaped of internal edge 108 may also help reduce the effects the group of inboard channels 80*b* has on the machining of the inboard disc face 62 during the manufacturing process.

It should be appreciated that the term "radially" is used herein to generally describe elements extending in or otherwise oriented along a direction located in the brake disc plane 56 that approaches or moves away from the outer periphery 88 of the brake disc 54. The direction need not directly fall along a radian extending in the brake disc plane 56 from the rotational axis 50 of the disc brake rotor 20. As such, the pair of radial walls 98*a* of each channel in the group of outboard channels 80*a* and the pair of radial walls 98*b* of each channel in the group of inboard channels 80*b* need not be straight and may be arranged at a variety of different angles and orientations. The inner wall 102*a* of each channel in the group of outboard channels 80*a* and the inner wall 102*b* of each channel in the group of inboard channels 80*b* are spaced from the inner periphery 90 of the brake disc 54 by an inner ring thickness 110. The outer wall 100*a* of each channel in the group of outboard channels 80*a* and the outer wall 100*b* of each channel in the group of inboard channels 80*b* are spaced from the outer periphery 88 of the brake disc 54 by an outer ring thickness 112. The inner ring thickness 110 and the outer ring thickness 112 may or may not be equal to one another and may be, for example and without limitation, in a range of 0.25 inches to 1 inch. It should also be appreciated that the channel depth 82 of each channel in the group of outboard channels 80*a* can be measured between the back wall 94 and the open front 92 and the channel depth 82 of each channel in the group of inboard channels 80b can be measured between the front wall 96 and the open back 106.

Optionally, the back wall 94 of each channel in the group of outboard channels 80a and the front wall 96 of each channel in the group of inboard channels 80b may be provided with a surface treatment 114 that is corrosion resistant. The surface treatment 114 may also extend to the pair of radial walls 98a, the outer wall 100a, and the inner wall 102a of each channel in the group of outboard channels 80a and the pair of radial walls 98b, the outer wall 100b, and the inner wall 102b of each channel in the group of inboard channels 80b. As previously stated, corrosion often acts as a thermal barrier reducing the effectiveness of heat transfer along any corroded surface. The surface treatment 114 protects from corrosion the surface to which it is applied and therefore preserves the effectiveness of heat transfer within the plurality of channels 80a, 80b. By way of non-limiting example, the surface treatment 114 may be a high temperature paint. In addition, the surface treatment 114 may have a color that is different from a color of the rest of the outboard disc face 60 and/or the inboard disc face 62 to give the disc brake rotor 20 an ornamental and an aesthetically pleasing appearance.

Figure 6:
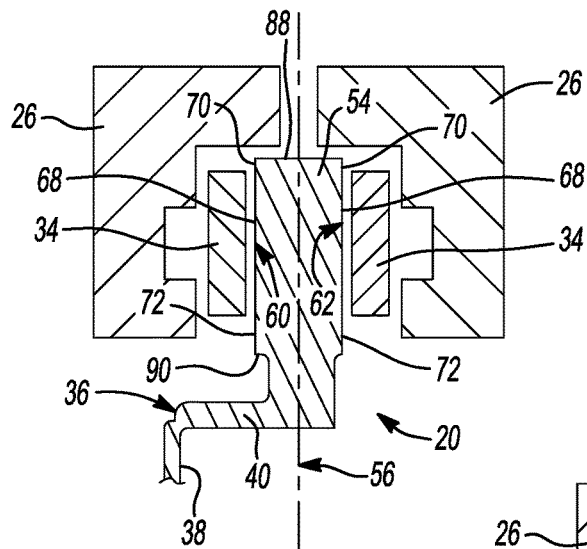
FIG. 6 is a side fragmentary view of part of the exemplary disc brake rotor illustrated in FIG. 1 shown in relation to exemplary brake pads.
Figure 7:
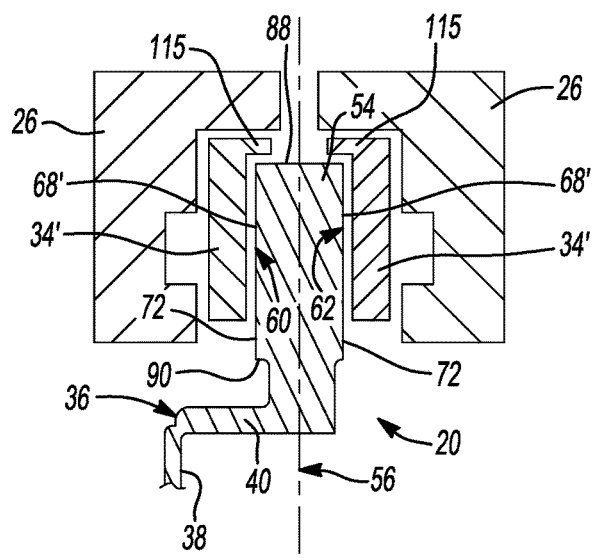
FIG. 7 is another side fragmentary view of part of the exemplary disc brake rotor illustrated in FIG. 1 shown in relation to other exemplary brake pads.

As noted above, the disc brake rotor 20 disclosed herein may be utilized with a number of different brake pad configurations. FIG. 7 illustrates another exemplary arrangement where different brake pads 34' are installed within the brake caliper 26. The brake pads 34' shown in FIG. 7 extend radially outward of the outer periphery 88 of the brake disc 54, but do not extend radially inward of the inner periphery 90 of the brake disc 54. Each brake pad 34' has an overhanging lip 115 that receives and overhangs at least part of the outer periphery 88 of the brake disc 54, giving the brake pads 34' an L-like shape or U-like shape when viewed from the side. In FIG. 7, the outboard disc face 60 and the inboard disc face 62 still have a brake pad contact area 68' and the inner non-contacting area 72, but the outer non-contacting area 70 illustrated in FIGS. 4-6 is eliminated. By eliminating the outer and/or the inner non-contacting area 70, 72, the brake pad contact area 68' in the configuration shown in FIG. 7 extends all the way to the outer and/or inner periphery 88, 90 of the brake disc 54 and therefore is larger than the brake pad contact area 68 shown in FIG. 6. For example, with the outer non-contacting area 70 eliminated, the plurality of channels 80a, 80b extend radially across at least part of the brake pad contact area 68' and optionally across at least part of the inner non-contacting area 72 of the outboard disc face 60 and the inboard disc face 62.

Figure 8:
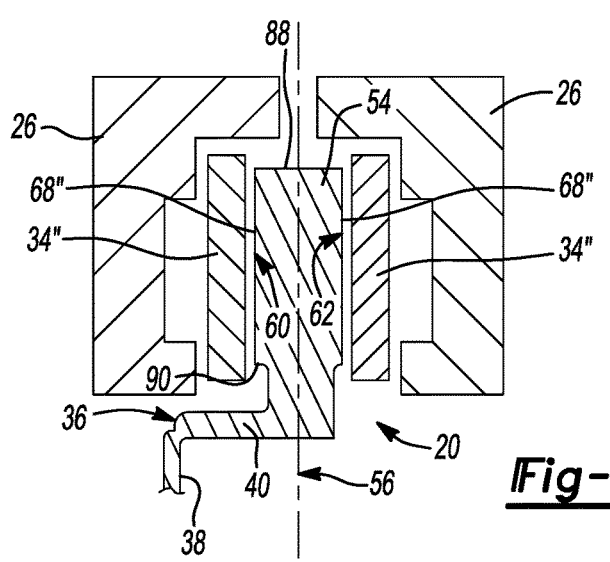
FIG. 8 is another side fragmentary view of part of the exemplary disc brake rotor illustrated in FIG. 1 shown in relation to other exemplary brake pads.

In the example shown in FIG. 8, another variation of brake pads 34" are shown installed within the brake caliper 26. These brake pads 34" extend radially outward of the outer periphery 88 of the brake disc 54 and extend radially inward of the inner periphery 90 of the brake disc 54. Therefore, in FIG. 8, the outboard disc face 60 and the inboard disc face 62 have a brake pad contact area 68" that is co-extensive with the outboard disc face 60 and the inboard disc face 62 and both the outer non-contacting area 70 and the inner non-contacting area 72 illustrated in FIGS. 4-6 are eliminated. By eliminating the outer non-contacting area 70 and the inner non-contacting area 72, the brake pad contact area 68" in the configuration shown in FIG. 8 extends from the outer periphery 88 of the brake disc 54 to the inner periphery 90 of the brake disc 54 and therefore is larger than the brake pad contact area 68 shown in FIG. 6 and the brake pad contact area 68' shown in FIG. 7. With both the outer non-contacting area 70 and the inner non-contacting area 72 eliminated, the plurality of channels 80a, 80b extend radially within the brake pad contact area 68" only, and therefore do not extend radially beyond the brake pad contact area 68". When the braking system 22 is activated, the brake pads 34" contact the entire radial height of the brake disc 54 and therefore clear dust and corrosion from all of the outboard disc face 60 and all of the inboard disc face 62. Advantageously, this configuration helps prevent rings of corrosion from forming on the outer non-contacting area 70 and the inner non-contacting area 72 of the outboard disc face 60 and the inboard disc face 62 and therefore helps maintain a clean appearance of the brake disc 54.

Comparing the disc brake rotor 20 shown in FIGS. 1-8 to the disc brake rotor 20' shown in FIGS. 9-12, the plurality of channels 80a, 80b may extend radially along the brake disc 54 in a curved line (FIGS. 1-8), a straight line (FIGS. 9-12), or combinations thereof where the plurality of channels 80a, 80b have straight and curved segments or where some of the channels 80a, 80b are straight and some of the channels 80a, 80b are curved (not shown). Referring to FIGS. 9-12, the inner wall 102b of each channel in the group of inboard channels 80b and the inner wall 102a of each channel in the group of outboard channels 80a optionally include an inner window 116. Each inner window 116 extends through the inner ring 86 of the brake disc 54' and passes between one channel in the plurality of channels 80a, 80b and one vent passageway in the plurality of vent passageways 78 to provide fluid communication therebetween. As a result, the inner windows 116 allow fluid flow between the plurality of vent passageways 78 and the plurality of channels 80a, 80b for enhanced convective cooling of the disc brake rotor 20'. The outer ring 84 of the brake disc 54' may optionally include an outer circumferential groove 118 that extends inwardly into the outer periphery 88 of the brake disc 54' such that the outer ring 84 is split into two circumferentially continuous and uninterrupted sections 120, each disposed to either side of the outer circumferential groove 118. In the example shown, the outer circumferential groove 118 extends within the brake disc plane 56, although other configurations are possible. The outer wall 100b of each channel in the group of inboard channels 80b and the outer wall 100a of each channel in the group of outboard channels 80a optionally include an outer window 122. Each outer window 122 extends through the outer ring 84 of the brake disc 54' and opens to the outer circumferential groove 118 to provide fluid communication there between. As a result, the outer windows 122 allow fluid flow between the plurality of channels 80a, 80b and the outer circumferential groove 118 for enhanced convective cooling of the disc brake rotor 20. It should be appreciated that various fluid flow paths through the plurality of channels 80a, 80b are possible because fluid can enter or exit the plurality of channels 80a, 80b through the inner windows 116, the outer windows 122, the open front 92 of the channels in the group of outboard channels 80a, and the open back 106 of the channels in the group of inboard channels 80b.

It should be appreciated that in the configuration illustrated in FIGS. 9-12, the outer ring 84 and the inner ring 86 are circumferentially continuous and uninterrupted along the outboard disc face 60 and the inboard disc face 62 of the brake disc 54'. Although the inner windows 116 extend through the inner ring 86, the inner ring 86 includes a ring of solid material along the outboard disc face 60 and a ring of solid material along the inboard disc face 62 that are disposed to each side of the inner windows 116. Similarly, although the outer windows 122 extend through the outer ring 84, the outer ring 84 includes a ring of solid material along the outboard disc face 60 and a ring of solid material along the inboard disc face 62 that are disposed to each side of the outer windows 122. Apart from these additional features, the other elements of the disc brake rotor 20' illustrated in FIGS. 9-12 are the same as those described above in connection with the disc brake rotor 20 illustrated in FIGS. 1-8.

Figure 9:
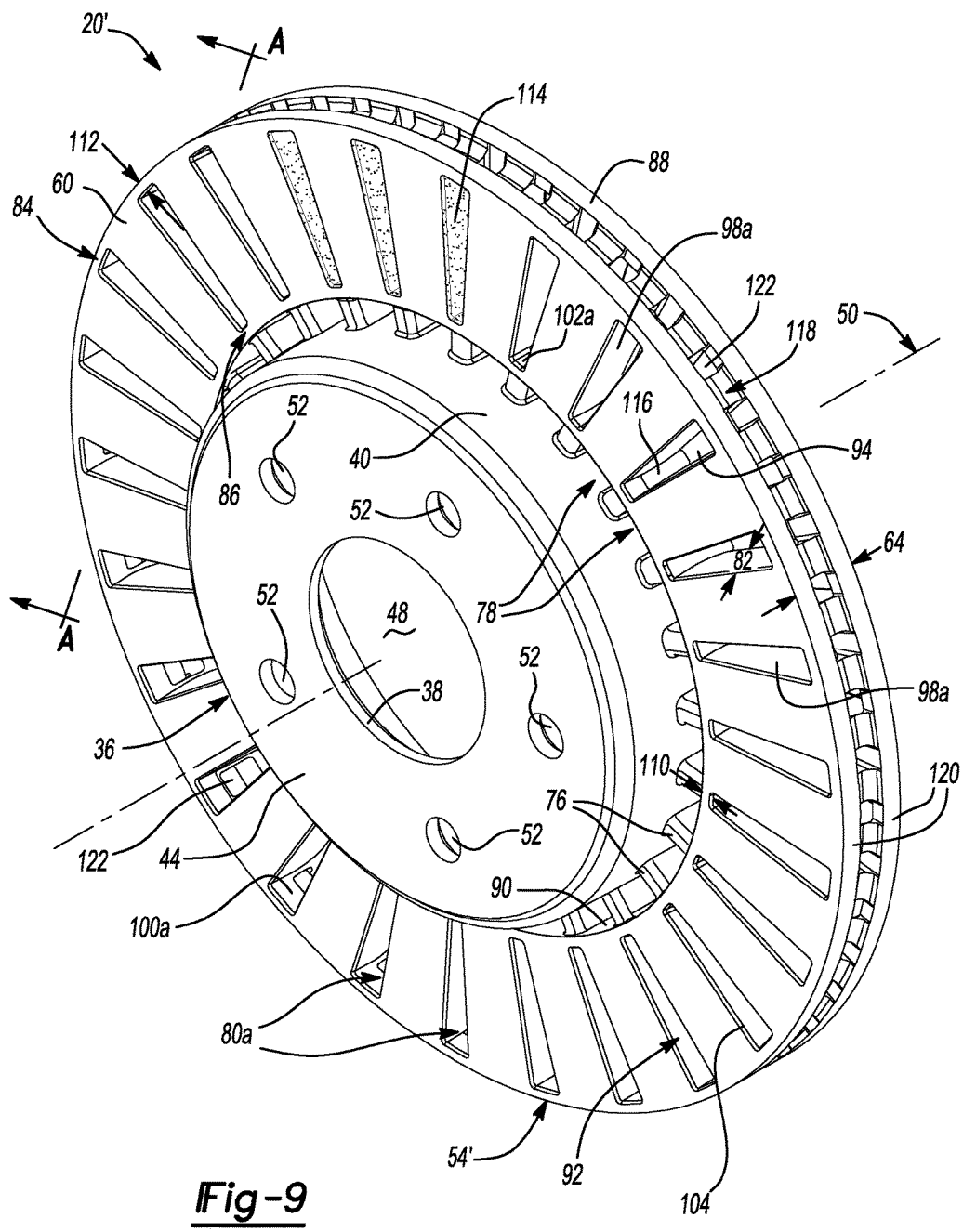
FIG. 9 is a front perspective view of another exemplary disc brake rotor constructed in accordance with the subject disclosure.
Figure 10:
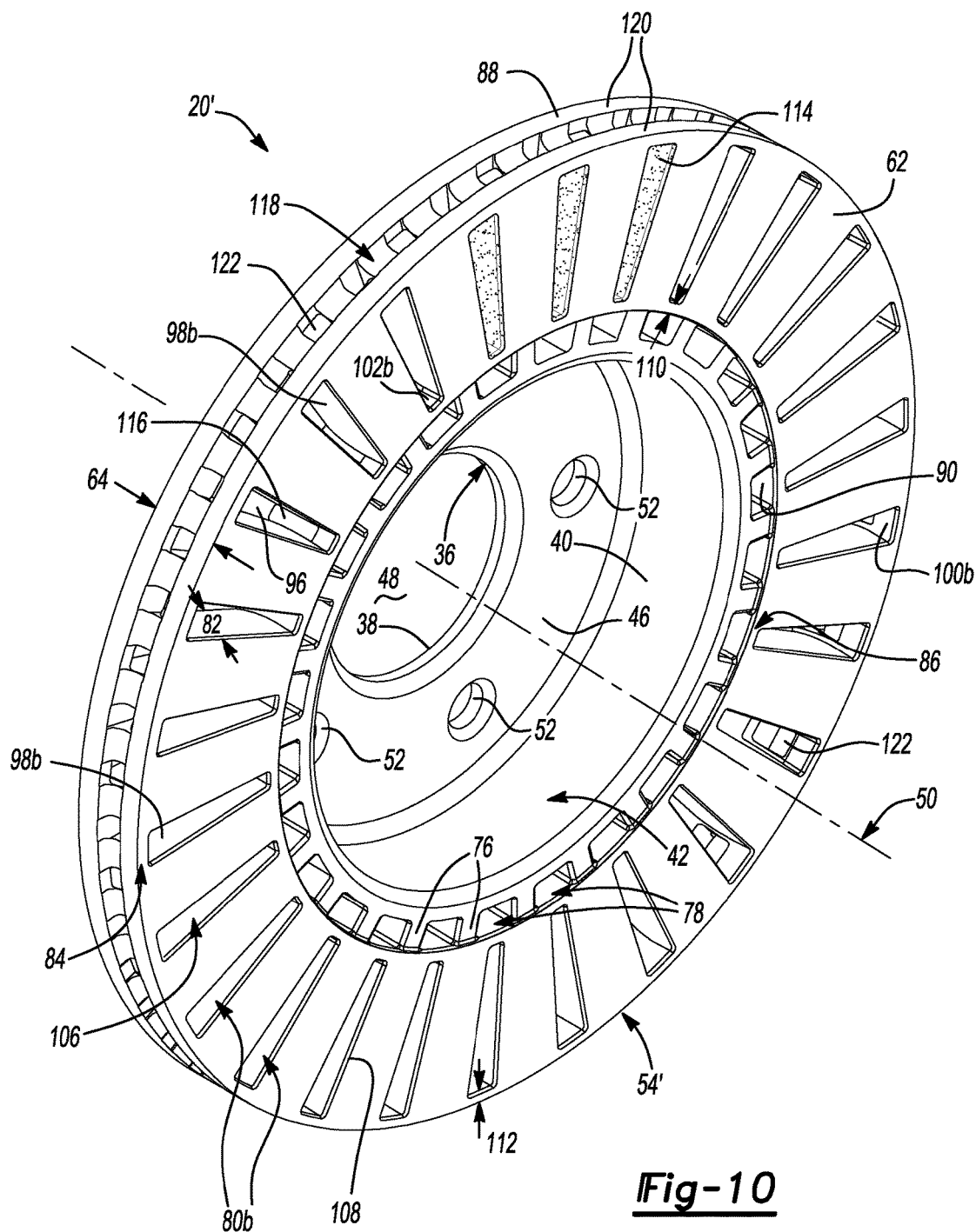
FIG. 10 is a rear perspective view of the exemplary disc brake rotor shown in FIG. 9.
Figure 13:
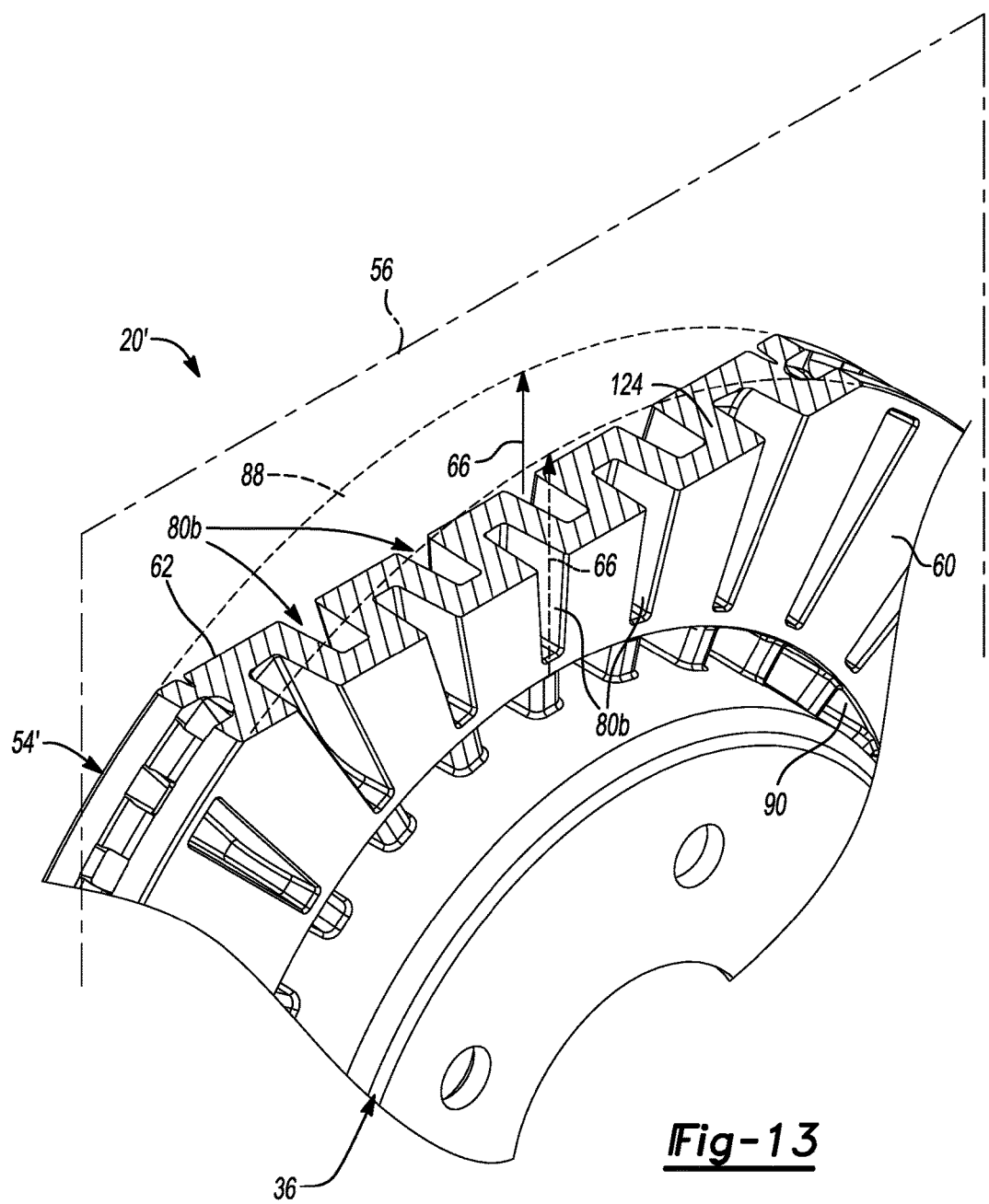
FIG. 13 is a section view of the exemplary disc brake rotor shown in FIG. 9 that is taken along section line A-A of FIG. 9.

FIG. 13 is a section view of the disc brake rotor 20' illustrated in FIG. 9 taken along section line A-A. As shown in this view, the circumferentially staggered, sequentially alternating arrangement of the plurality of channels 80a, 80b described above gives the brake disc 54' a serpentine cross-section 124. It should be appreciated that the serpentine cross-section 124 of the brake disc 54', as seen in FIG. 13, is transverse to both the brake disc plane 56 and the first radial height 66 of the outboard disc face 60 and the inboard disc face 62. It should also be appreciated that the serpentine cross-section 124 of the brake disc 54' illustrated generally follows the shape of an oscillating step waveform, which includes sequentially alternating valleys and peaks that are themselves generally rectangular in shape.

Figure 11:
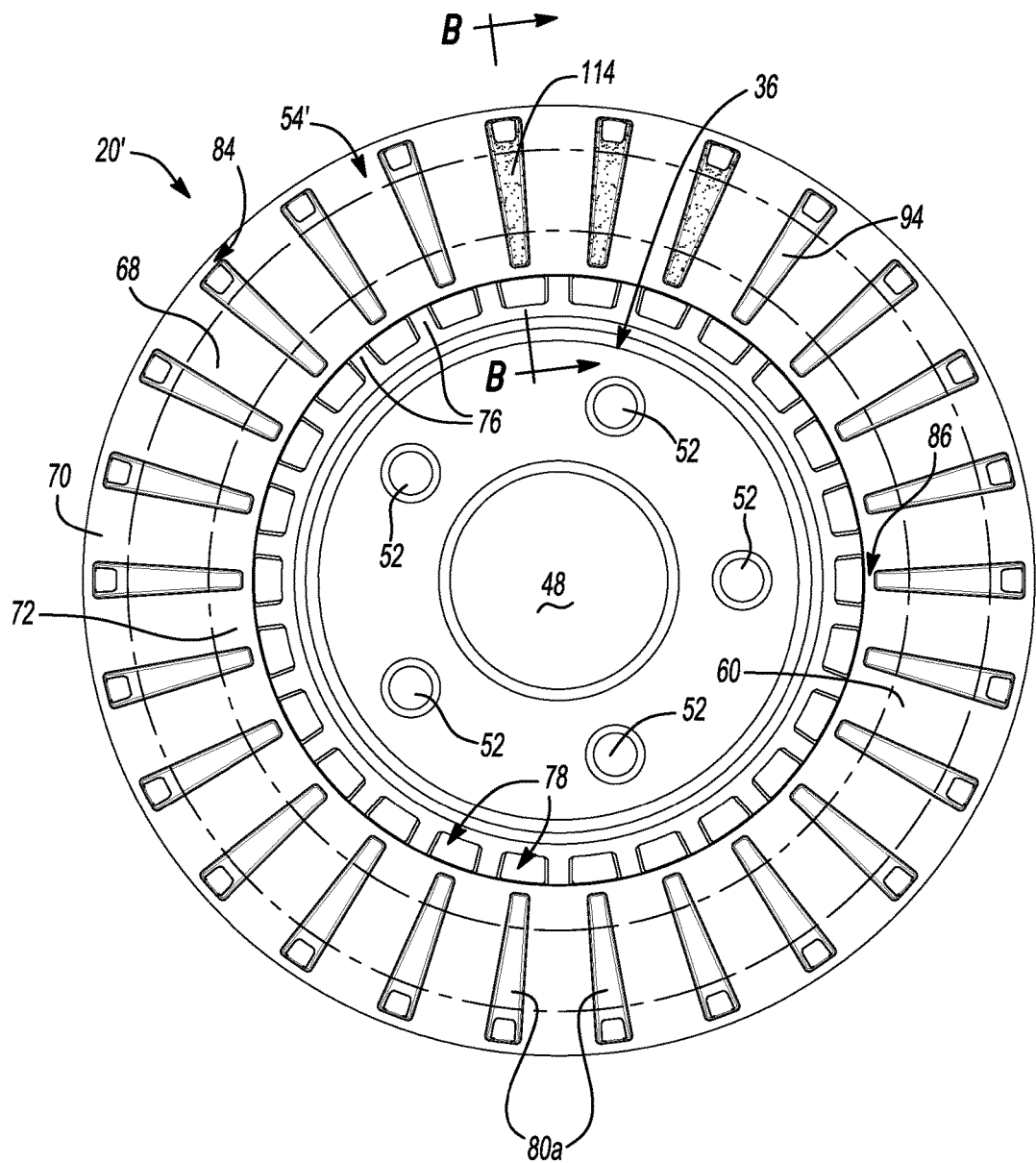
FIG. 11 is a front elevation view of the exemplary disc brake rotor shown in FIG. 9.
Figure 12:
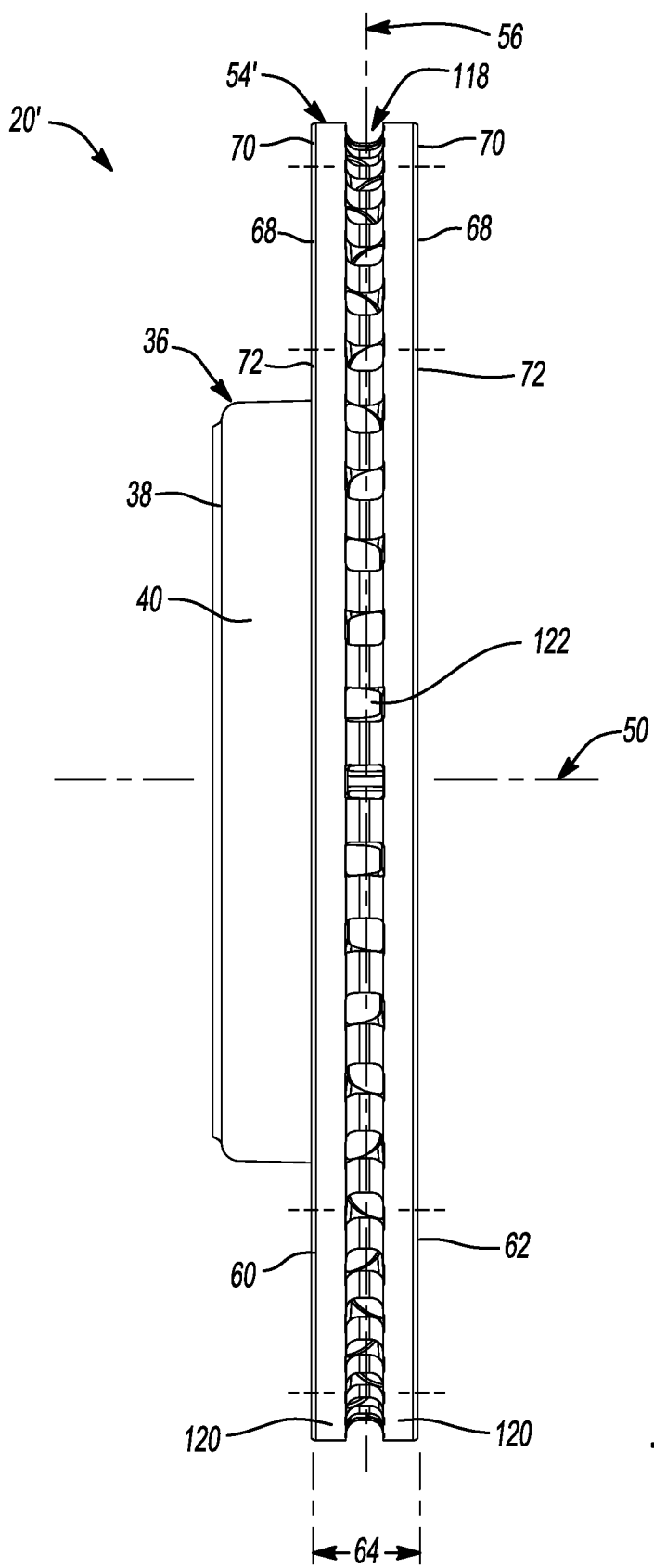
FIG. 12 is a side elevation view of the exemplary disc brake rotor shown in FIG. 9.

FIG. 14 is a partial cross-sectional view of the disc brake rotor 20' illustrated in FIG. 11 taken along section line B-B where one of the channels in the group of outboard channels 80a is shown. Each of the pair of radial walls 98a meet the outboard disc face 60 at the external edges 104. The external edges 104 are rounded for diminished brake pad wear. The curvature of the external edges 104 are defined by a radius 126 and the radius 126 intersects an imaginary plane 128 that is parallel to and spaced from or co-extensive with the brake disc plane 56. The rounded shape of the external edges 104 may be created in a number of different ways, including by an initial casting operation followed by a machining operation. One exemplary method for creating the rounded shape of the external edges 104 is described below. The brake disc 54' of the disc brake rotor 20' may initially be formed to have an initial thickness 130 that is greater than the brake disc thickness 64 and a relatively large radius 126. From this initial thickness 130, the outboard disc face 60 and/or the inboard disc face 62 may be machined down until the brake disc thickness 64 is reached. The radius 126 of the external edges 104 may be created when the brake disc 54 is at the initial thickness 130 such that each of the external edges 104 may initially extend along a 90 degree arc from one of the radial walls 98a to the outboard disc face 60. As illustrated in FIG. 14, the 90 degree arc is measured relative to the imaginary plane 128. As the outboard disc face 60 is machined down to achieve the brake disc thickness 64, material is removed along the 90 degree arc (e.g. approximately 30 degrees of material adjacent the outboard disc face 60 may be removed). Accordingly, each of the external edges 104 may ultimately extend in a 60 degree arc from the one of the radial walls 98a to the outboard disc face 60. As illustrated in FIG. 14, the 60 degree arc is also measured relative to the imaginary plane 128. This same method may be applied to create the rounded shape of the external edges 104 located between the outboard disc face 60 and the outer wall 100a, the outboard disc face 60 and the inner wall 102a, and for all of the internal edges 108 that are disposed along the inboard disc face 62.

FIG. 15 is a partial cross-sectional view of the disc brake rotor 20' illustrated in FIG. 11 taken along section line B-B. The brake disc 54' optionally includes rounded outside edges 132 where the outboard and inboard disc faces 60, 62 meet the outer periphery 88. Similarly, the brake disc 54' optionally includes rounded inside edges 134 where the outboard and inboard disc faces 60, 62 meet the inner periphery 90. The curvature of the rounded outside and inside edges 132, 134 is defined by a radius 136. The radius 136 intersects the imaginary plane 128, which is parallel to and spaced from or co-extensive with the brake disc plane 56. The rounded shape of the rounded outside and inside edges 132, 134 may be created in a number of different ways, including by an initial casting operation followed by a machining operation. For example, the rounded shape of the rounded outside and inside edges 132, 134 may be created using the same machining process described above for creating the rounded shape of the external edges 104. Accordingly, each of the rounded outside edges 132 may ultimately extend in a 60 degree arc from the one of the outboard and inboard disc faces 60, 62 to the outer periphery 88 and each of the rounded inside edges 134 may ultimately extend in a 60 degree arc from the one of the outboard and inboard disc faces 60, 62 to the inner periphery 90. As illustrated in FIG. 15, the 60 degree arc is measured relative to the imaginary plane 128. Although this configuration is not limited to any particular brake pad configuration, the rounded outside and inside edges 132, 134 may be particularly desirable where the brake pads 34' have an L-like or U-like shape as shown in FIG. 7. When brake pads 34' having an L-like or U-like shape are used, a brake disc 54 with abrupt edges (FIG. 2) may tend to make noise and/or create excessive brake pad wear.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. These antecedent recitations should be interpreted to cover any combination in which the inventive novelty exercises its utility. Many modifications and variations of the present invention are possible in light of the above teachings and may be practiced otherwise than as specifically described while within the scope of the appended claims.

What is claimed is:

1. A disc brake rotor comprising:
a hub portion;
a brake disc extending radially outward from said hub portion, said brake disc including an outboard disc face and an inboard disc face;
a plurality of channels disposed in said brake disc that are circumferentially spaced apart from one another where any one channel in said plurality of channels is open to said outboard disc face and is closed to said inboard disc face or is open to said inboard disc face and is closed to said outboard disc face; and
said brake disc including an uninterrupted outer ring extending from said outboard disc face to said inboard disc face, said brake disc including an inner ring circumferentially continuous and uninterrupted along at least said outboard disc face and said inboard disc face to increase a strength of said brake disc, said outer ring being radially spaced from said inner ring with said plurality of channels disposed radially between said outer ring and said inner ring, wherein said outer ring defines an outer periphery of said brake disc and said inner ring defines an inner periphery of said brake disc, wherein each channel in said plurality of channels includes at least a pair of radial walls that are circumferentially spaced from one another, an outer wall defined by said outer ring that extends between said pair of radial walls, and an inner wall defined by said inner ring that extends between said pair of radial walls.

2. The disc brake rotor as set forth in claim 1, further comprising:
a plurality of ribs extending between and interconnecting said hub portion and said inner ring of said brake disc such that said inner ring is positioned radially between said plurality of ribs and said plurality of channels, said plurality of ribs being circumferentially spaced apart from one another by a plurality of vent passageways that extend entirely through said disc brake rotor.

3. The disc brake rotor as set forth in claim 2, wherein said inner wall of each channel in said plurality of channels includes an inner window, each inner window extending between one channel in said plurality of channels and one vent passageway in said plurality of vent passageways to provide fluid communication therebetween.

4. The disc brake rotor as set forth in claim 3, wherein said inner ring provides a ring of solid material along said outboard disc face and a ring of solid material along said inboard disc face.

5. The disc brake rotor as set forth in claim 1, wherein said outer ring includes an outer circumferential groove that extends inwardly into said outer periphery of said brake disc such that said outer ring is split into two circumferentially continuous and uninterrupted sections.

6. The disc brake rotor as set forth in claim 5, wherein said outer wall of each channel in said plurality of channels includes an outer window, each outer window extending between one channel in said plurality of channels and said outer circumferential groove to provide fluid communication therebetween.

7. The disc brake rotor as set forth in claim 6, wherein said outer ring provides a ring of solid material along said outboard disc face and a ring of solid material along said inboard disc face that are disposed to each side of each outer window.

8. The disc brake rotor as set forth in claim 1, wherein said inner wall of each channel in said plurality of channels is radially spaced from said inner periphery by an inner ring thickness and said outer wall of each channel in said plurality of outboard channels is radially spaced from said outer periphery by an outer ring thickness.

9. The disc brake rotor as set forth in claim 1, wherein each of said pair of radial walls, said outer wall, and said inner wall have an external edge that is rounded.

10. The disc brake rotor as set forth in claim 1, wherein said outboard disc face and said inboard disc face are spaced apart from one another by a brake disc thickness and each channel in said plurality of channels having a channel depth that is greater than half said brake disc thickness.

11. A disc brake rotor comprising:
a hub portion including a mounting flange, an cylindrical wall that extends circumferentially from said mounting flange to define a hub receiving cavity, a central opening that extends through said mounting flange, and a plurality of mounting holes that extend through said mounting flange at circumferentially spaced locations positioned radially between said central opening and said cylindrical wall;
a one-piece brake disc extending radially outward from said cylindrical wall of said hub portion, said brake disc defining a brake disc plane that bisects said brake disc, said brake disc plane being parallel to and spaced from said mounting flange of said hub portion;
said brake disc including an outboard disc face that is positioned to one side of said brake disc plane and an inboard disc face that is positioned to an opposite side of said brake disc plane, said inboard disc face extending parallel to and being spaced from said outboard disc face by a brake disc thickness;
a plurality of channels disposed in said brake disc that are circumferentially spaced apart from one another, said plurality of channels including a group of outboard channels that are open at said outboard disc face and closed at said inboard disc face and a group of inboard channels that are open at said inboard disc face and closed at said outboard disc face;
each channel in said plurality of channels having a channel depth extending transverse to said brake disc plane that is greater than half said brake disc thickness; and
said brake disc including an outer ring extending from said outboard disc face to said inboard disc face circumferentially continuous and uninterrupted to increase a strength of said brake disc, said outer ring being radially spaced from an inner ring of said brake disc with said plurality of channels disposed radially between said outer ring and said inner ring.

12. The disc brake rotor as set forth in claim 11, wherein said plurality of channels extend radially in a straight line, a curved line, or combinations thereof.

13. The disc brake rotor as set forth in claim 11, further comprising:
a plurality of ribs extending between and interconnecting said hub portion and said inner ring of said brake disc such that said inner ring is positioned radially between said plurality of ribs and said plurality of channels, said plurality of ribs being circumferentially spaced apart from one another by a plurality of vent passageways that extend entirely through said disc brake rotor, and said plurality of ribs extending radially in a straight line, a curved line, or combinations thereof.

* * * * *